United States Patent
Crilly, Jr. et al.

(10) Patent No.: US 9,354,293 B2
(45) Date of Patent: May 31, 2016

(54) PILOT BEACON SYSTEM FOR INDOOR POSITIONING

(71) Applicant: CELLULAR SPECIALTIES, INC., Manchester, NH (US)

(72) Inventors: William J. Crilly, Jr., Dunbarton, NH (US); Philip Ziegler, Montville, NJ (US)

(73) Assignee: Westell, Inc., Aurora, IL (US)

( * ) Notice: Subject to any disclaimer, the term of this patent is extended or adjusted under 35 U.S.C. 154(b) by 254 days.

(21) Appl. No.: 13/623,133

(22) Filed: Sep. 20, 2012

(65) Prior Publication Data

US 2013/0084886 A1     Apr. 4, 2013

Related U.S. Application Data

(60) Provisional application No. 61/626,819, filed on Oct. 3, 2011.

(51) Int. Cl.
| | |
|---|---|
| *H04W 24/00* | (2009.01) |
| *G01S 1/20* | (2006.01) |
| *H04W 64/00* | (2009.01) |
| *G01S 1/24* | (2006.01) |
| *G01S 5/02* | (2010.01) |

(52) U.S. Cl.
CPC ... *G01S 1/20* (2013.01); *G01S 1/24* (2013.01); *G01S 5/0268* (2013.01); *H04W 64/00* (2013.01)

(58) Field of Classification Search
CPC .......... G01S 1/20; G01S 1/24; G01S 5/0268; G01S 5/14; H04W 64/00; H04W 52/325; H04B 17/0072
USPC ....................................................... 455/456.1
See application file for complete search history.

(56) References Cited

U.S. PATENT DOCUMENTS

| | | | |
|---|---|---|---|
| 5,917,811 | A | 6/1999 | Weaver, Jr. et al. |
| 6,556,551 | B1 | 4/2003 | Schwartz |
| 6,687,501 | B2 | 2/2004 | Soliman |
| 7,123,928 | B2 | 10/2006 | Moeglein et al. |
| 2002/0048071 | A1 | 4/2002 | Suzuki et al. |
| 2003/0008663 | A1 | 1/2003 | Stein et al. |
| 2003/0050041 | A1 | 3/2003 | Wu |
| 2003/0157943 | A1 | 8/2003 | Sabat, Jr. |
| 2004/0203864 | A1* | 10/2004 | DiBuduo ............... H04W 64/00 455/456.1 |
| 2004/0266459 | A1* | 12/2004 | Lee ........................... 455/456.6 |
| 2005/0075139 | A1 | 4/2005 | Shapira |
| 2007/0291867 | A1 | 12/2007 | Kahn et al. |
| 2009/0163224 | A1* | 6/2009 | Dean et al. ................. 455/456.1 |
| 2009/0191891 | A1* | 7/2009 | Ma et al. .................... 455/456.1 |

(Continued)

OTHER PUBLICATIONS

Sam Knight, gpsOne Enabled LBS, A North American Case Study, TechnoCom Wireless Location Leaders, 2002 CDMA Americas Congress, Dec. 2002.

(Continued)

*Primary Examiner* — Timothy Pham
(74) *Attorney, Agent, or Firm* — Michael J. Curley; Quarles & Brady LLP (57) ABSTRACT

The system and method uses a one or more pilot beacons to more accurately locate the position of an indoor mobile device. Modulation and level control of the co-pilot beacons provides a third dimension, z-axis, of positioning. An augmented Position Determining Entity ("aPDE") can be used which does not modify the existing PDE in the network, and facilitates and ensures high-integrity information during a 2D to 3D positioning upgrade.

10 Claims, 5 Drawing Sheets

(56) References Cited

U.S. PATENT DOCUMENTS

| | | |
|---|---|---|
| 2009/0233605 A1 | 9/2009 | Kim |
| 2009/0323582 A1 | 12/2009 | Proctor, Jr. et al. |
| 2010/0091678 A1 | 4/2010 | Chen et al. |
| 2010/0309884 A1 | 12/2010 | Haverty |
| 2011/0028161 A1* | 2/2011 | Larsen ........................ 455/456.1 |

OTHER PUBLICATIONS

Qualcomm Incorporated, Qualcomm Repeater Technologies to Improve Network Performance, 80-W0013-1 Rev A, 2003, Qualcomm Incorporated, San Diego, CA 92121 USA.

Federal Communications Commission, OET Bulletin No. 71, Guidelines for Testing and Verifying the Accuracy of Wireless E911 Location Systems, Apr. 12, 2000.

Jeffrey H. Reed, Kevin J. Krizman, Brian D. Woerner, Theodore S. Rappaport, An Overview of the Challenges and Progress in Meeting the E-911 Requirement for Location Service, IEEE Communications Magazine, Apr. 1998, pp. 30-37.

Andy D. Kucar, Mobile Radio: An Overview, IEEE Communications Magazine, Nov. 1991, pp. 72-85.

GPS-practice-and-fun.com, Find it with GPS, A-GPS explained in historical context, Introduction to Assisted-GPS (A-GPS).

Waqas Ur Rehman, Eyal De Lara, Stefan Saroiu, CILoS Indoor Localization System, UBIComp '08, Sep. 21-24, 2008, Seoul, Korea. Copyright 2008 ACM 978-1-60558-136-1/08/09.

Federal Communications Commision, Comment Sought on Proposals Regarding Service Rules for Wireless Enhanced 911 Phase II Location Accuracy and Reliability, PS Docket No. 07-114, DA 08-2129, Released Sep. 22, 2008.

Nadezda Sokolova, Borje Forssell, Modern Pedestrian Traffic, Indoor HSGPS Receiver Performance, European Journal of Navigation, vol. 5, No. 3, Jul. 2007.

Qualcomm Engineering Services Group, Qualcomm White Paper, Repeaters for Indoor Coverage in CDMA Networks, 80-31576-1 Rev B, Qualcom Incorporated, San Diego, CA 92121-1714, USA, 2003.

Qualcomm CDMA Technologies, gpsOne User Plane Handset Specification, Qualcomm Incorporated, San Diego, CA 92121-1714 USA, 80-V6114-1NP Rev. D, Jul. 11, 2003.

Qualcomm, gpsOne User Plane Handset V2 Protocol Specification (Nonproprietary), Qualcomm Incorporated and SnapTrack, Inc., 80-V6114-2NP B, May 26, 2004.

Masudur Rahman, Per Ernstrom, Repeaters for Hotspot Capacity in DS-CDMA Networks, IEEE Transactions on Vehicular Technology, vol. 53, No. 3, May 2004, pp. 626-633.

Wang Kedong, Yan Lei, Wen Hui, He Kai, GpsOne: a New Solution to Vehicle Navigation, 0-7803-8416-4/04, 2004 IEEE, pp. 341-346.

Christian B. Almazan, Moustafa Youssef, Ashok K. Agrawala, Rover: An Integration and Fusion Platform to Enhance Situational Awareness, 1-4244-1338-6/07, 2007 IEEE, pp. 582-587.

TIA/EIA Interim Standard, Position Determination Service Standards for Dual Mode Spread Spectrum Systems, Addendum 1, TIA/EIA/IS-801-1, Mar. 2001, Telecommunications Industry Association 2001, Arlington, VA 22201, USA.

\* cited by examiner

PILOT BEACON SYSTEM FOR INDOOR POSITIONING

CROSS REFERENCE TO RELATED APPLICATIONS

This application claims the benefit of U.S. Provisional Application No. 61/626,819, filed Oct. 3, 2011, the contents of which are incorporated by reference herein in their entirety.

FIELD OF THE INVENTION

This invention relates generally to locating the position of a cellular handset. More particularly, it relates to using a pilot beacon system to locate the position of an indoor handset.

BACKGROUND OF THE INVENTION

It has become common when using a cellular handset or smart-phone to have the capability to accurately locate the position of the cellular device. Positioning is required during a 911 emergency call, and for the use of location-aware software applications (LASA), e.g. navigation and location-targeted advertising. Cellular location technologies use one or more of a variety of methods, including Uplink-Time Difference of Arrival (U-TDOA) for GSM networks, Advanced Forward Link Trilateration (AFLT) for CDMA networks, and handset-based Global Positioning System (GPS) or Assisted GPS (A-GPS) in any type of cellular network to determine the location of the handset.

The number of indoor repeater applications has increased greatly in the last several years (and should continue to expand unabated), but today's public safety sensitive environment has highlighted a shortcoming of these designs. Although the increased indoor wireless coverage has proved to be a boon for the wireless customer from both a value of service and safety standpoint, recent gains in location services for both navigation and public safety have left indoor applications as position location holes.

In indoor applications, the normal methods used for location determination (i.e. direct reception of GPS by the mobile station or triangulation using the signals from multiple base stations) do not work. Signals from the GPS system are sufficiently weak that even if the mobile station's GPS receiver might ultimately be able to lock on to the satellites, the acquisition time will be too long. Furthermore, indoor service is typically provided either by a single strong local cell, distributed within the building, or by using a repeater, so there are not multiple signals on which to triangulate. Repeaters tend to exacerbate the problem due to inherent delays which facilitate erroneous triangulation coordinates, in addition, repeater signals are significantly stronger than macro network leakage signals, thus reducing the capability of receiving macro position signals.

SUMMARY OF THE INVENTION

It has been recognized that there is an existing, well-known problem of positioning wireless calls made indoors, due to the lack of GPS, and the presence of a Distributed Antenna System. Co-Pilot Beacons of the present invention are deployed with PNs chosen from nearby sectors of the macro network and will provide improved accuracy while simplifying installation of E911 and Location Based Services for indoor positioning, when a Distributed Antenna System is present in the building(s), or when a repeater is used with a single stand-alone server antenna.

Modulation and level control of the Co-Pilot beacons of the present invention is also described herein and provides a third dimension, a-axis, of positioning. 3D position is not currently implemented in E911 position reporting. An augmented Position Determining Entity ("aPDE") is disclosed herein that does not modify the existing PDE in the network. This new PDE, or aPDE, facilitates and ensures high-integrity information during a 2D to 3D positioning upgrade, includes the z-axis in position information which is reported to the Public Safety Answering Point ("PSAP"). The X-Y position information is provided by the existing PDE and location server, while the floor number and altitude information is provided to the PSAP separately by the new z-axis aPDE, using the Co-Pilot Beacon transmitted signal information of the present invention. The aPDE also enhances the X-Y position accuracy.

In a 2D outdoor to 21 indoor upgrade (i.e. without 3D) no change is required to the existing infrastructure, databases, or handsets to facilitate an improved E911 position fix to the PSAP. Location Based Services ("LBS") positioning requirements are similarly enhanced without modification to the existing network. The present invention also provides an important ease of upgrade capability. The enhanced indoor positioning may be implemented with little to no involvement of the wireless carrier, other than permission to transmit and approval of network equipment. The Co-Pilot Beacon methods disclosed herein may be applied to any positioning technology that uses handset-based downlink measurements, including, but not limited to, LTE time difference of arrival measurements using 3GPP standardized Positioning Reference Signals.

Applicant's own work, U.S. patent application Ser. No. 13/009,803, (filed Jan. 19, 2011) published as Publication No. 2011/0177827 is hereby incorporated by reference. The present invention provides numerous improvements over the methods and apparatus disclosed therein.

One aspect of the present invention is a method for determining the location of a wireless handset in a building, comprising: providing one or more pilot beacons comprising PN codes with PN offsets and associated location information, wherein the pilot beacons are located inside a building; providing a macro network comprising a plurality of PN codes with PN offsets and associated location information; providing an existing PDE comprising output fix files; providing an augmented PDE comprising output fix files; determining the HEPE of the existing PDE output fix file; determining the HEPE of the augmented PDE output fix file; comparing the HEPE from the existing PDE output fix file with the HEPE from the augmented PDE output fix file; and determining whether the HEPE from the augmented PDE output fix file should be used as the position fix for use in locating a wireless handset in a building.

One embodiment of the method for determining the location of a wireless handset in a building further comprises the step of modifying the PN offsets of the pilot beacons.

One embodiment of the method for determining the location of a wireless handset in a building is wherein the step of modifying comprises adjusting the power level.

One embodiment of the method for determining the location of a wireless handset in a building is wherein the step of modifying comprises adjusting the amplitude.

One embodiment of the method for determining the location of a wireless handset in a building is wherein the step of modifying comprises adjusting the time modulation.

One embodiment of the method for determining the location of a wireless handset in a building is wherein the existing PDE output fix file comprises x-y coordinate information.

Another aspect of the present invention is a method for determining the location of a wireless handset in a building, comprising: providing one or more pilot beacons comprising PN codes with PN offsets and associated location information, wherein the pilot beacons are located inside a building; providing a macro network comprising a plurality of PN codes with PN offsets and associated location information; providing a PDE comprising output fix files; modifying the PN offsets of the pilot beacons; and determining from the PDE output fix file the position fix for use in locating a wireless handset in a building.

One embodiment of the method for determining the location of a wireless handset in a building is wherein the step of modifying comprises adjusting the power level.

One embodiment of the method for determining the location of a wireless handset in a building is wherein the step of modifying comprises adjusting the amplitude.

One embodiment of the method for determining the location of a wireless handset in a building is wherein the step of modifying comprises adjusting the time modulation.

One embodiment of the method for determining the location of a wireless handset in a building is wherein the existing PDE output fix file comprises x-y coordinate information.

One embodiment of the method for determining the location of a wireless handset in a building is wherein the step of modifying comprises mimicking the PN offsets of the macro.

One embodiment of the method for determining the location of a wireless handset in a building further comprises providing a wireless handset configured to receive and to transmit information for use by the PDE in locating a wireless handset in a building.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The Co-Pilot Beacons ("CPB") of the method and system of the present invention provide a location based solution for simulcast CDMA Distributed Antenna Systems (DASs). The present invention improves location accuracy of cell phones and wireless devices outdoors and within buildings. Several facilities that can benefit from this solution include, but are not limited to, college campuses, hospitals, malls, stadiums, warehouses and mid-sized to large office environments seeking to improve public safety or location based services (LBS) by enhancing cell phone location determination.

In one embodiment of the present invention, placing Co-Pilot Beacons in selected locations enables the mobile devices to quickly and reliably receive fixed position references that allow the network to determine a handset or cell phone's specific position. This information can then be used to aid the GPS receiver in acquiring signals, if they are present, or it can be used directly as a position report until more accurate information becomes available. Position is used herein to describe information including, but not limited to, latitude, longitude, altitude, and the like, whereas location is used to represent a street address, or some other form of geographic identification (e.g. 33 North Commercial Street).

One embodiment of the system and method of the present invention provides an augmented PDE with low delay. A PDE is a Position Determination Entity that uses reported device measurements to calculate a position fix. The present invention also provides pilot beacons used for indoor ranging by augmenting a PDE fix file with an algorithm that uses the PDE output fixes to calculate the position of an indoor handset.

Figure 1:
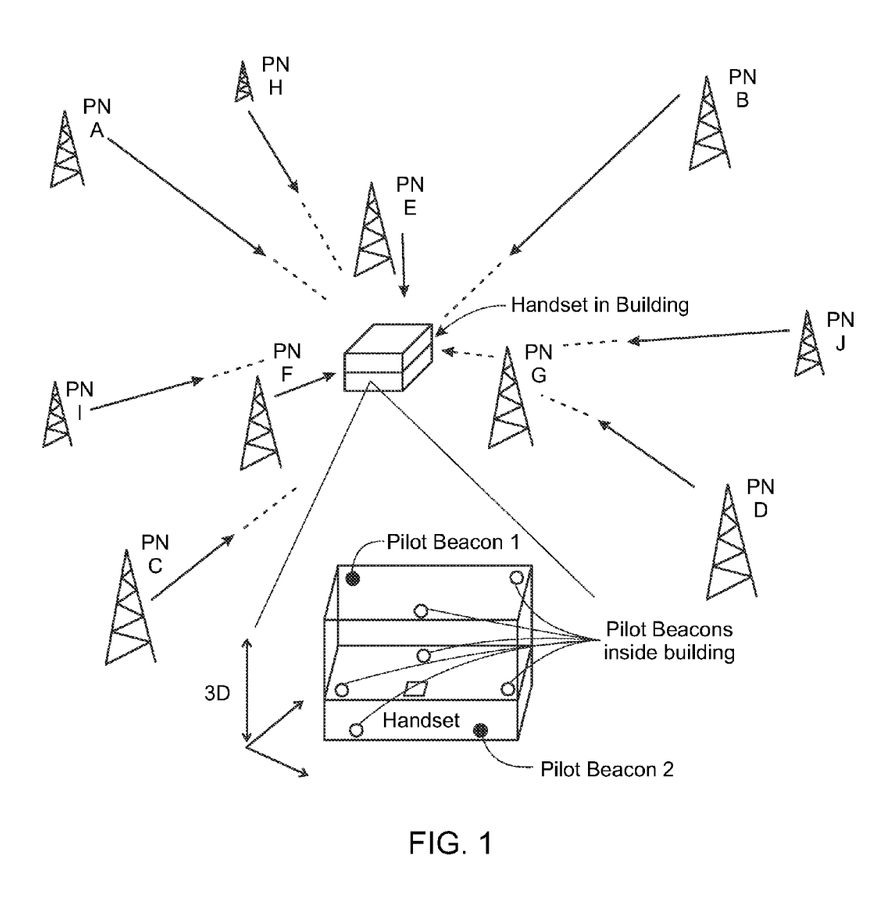
FIG. 1 shows an embodiment of the method and system to locate the position of an indoor handset using co-pilot beacons of the present invention.

Referring to FIG. 1, pilot beacons are used in the indoor space and use PN codes of the macro (e.g. PNA, PNB, PNC, PND, PNH, PNI, PNJ) to differentiate between PNs E, F, and G, which may propagate into the building. These pilot beacon PNs may re-use the macro PNs (i.e. from the outdoor network) and have Tau value settings that may produce the position values expected if the real PNs were propagating into the building. The Tau is the hardware delay that is set into the pilot beacon signal. The actual overall delay includes the delay associated with signal propagation.

Tau ($\tau$), or Timing Offset or Delay Adjustment, is the timing of the downlink signal required to be aligned with the EST as it is transmitted from the antenna in CDMA. Tau allows the timing of the internal PN Sequence to be adjusted to compensate for the delays of the base station hardware such that the timing will be correct at the antenna. EST, or Even Second Tick, in the CDMA cellular system is used to ensure that all time values are referenced to the start of the even seconds of time as indicated by GPS. CDMA, or Code Division Multiple Access, is a digital wireless technology. It is a general type of technology, implemented in many specific technologies, but the term "COMA" is also commonly used to refer to one specific family of technologies (IS-95 and CDMA2000). Other wireless communication technologies known to those of skill in the art are also contemplated.

PN, or Pseudo random Number, is a number chosen by an algorithm that approximates a random process. A PN Number in the CDMA system is a subset of the possible PN Offsets that are used for base station identification. Each of these allowed offsets are given, a unique number from 0 to 511. A PN Offset is the same as PN Number. A PN Sequence is the coded repetitive signal time sequence developed for use as a pilot signal. The PN Sequence signal is offset in time from a time reference by the PN offset. For example, PN0 has zero offset, PN1 has 52.08333 microseconds offset, etc., all offsets of the same underlying repetitive code, the PN sequence.

An augmented PDE ("aPDE") is placed into the existing system with knowledge of the various PNs and their respective locations. The aPDE calculates from the PDE fix file the estimated location of the handset or smartphone, also referred to as devices or user equipment, and compares the Horizontal Estimated Position Error ("HEPE") to the HEPE of the fix provided by the aPDE. If the HEPE of the aPDE is less than the HEPE of the PDE, then the aPDE estimate is used as the position fix and is sent to the location database as the information to be used by the PSAP for E911 location. The information sent may also include handset measurements, delays, signal strength, and the like. Handset identification is required to be sent by the aPDE, as it is sent with the PDE, so the position fix will be associated with the particular handset being positioned.

Figure 2:
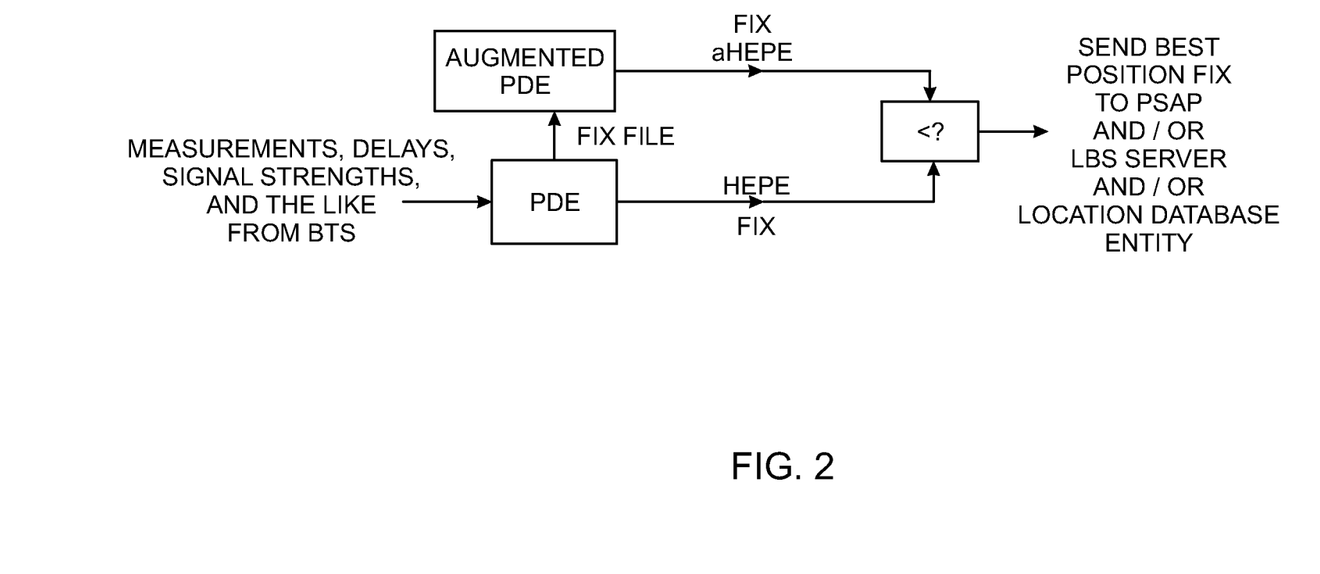
FIG. 2 shows an embodiment of the augmented PDE of the present invention.

Referring to FIG. 2, there are several advantages of the system and method of the present invention. First, there are no changes required to the main PDE for indoor location fixes. The system and method of the present invention may run in parallel to the main PDE. Second, no additions are required to the Base Station Almanac of the PDE or the Base Station geographic database to account for the Pilot Beacon. PNs. Furthermore, PNs will not be exhausted, if alternatively, new PNs are required. Third, three-dimensional positioning algorithms may be added to the PDE. Lastly, no access to the existing PDE source code or algorithms is required as the fix file and other output files are the interface, allowing new algorithms to be developed, used, and tested without risking a change to the main PDE algorithm.

Other advantages of the system and method of the present invention include pilot beacon PNs that have Tau offsets set early so that handsets will report these pilot beacons rather than the distant PNs of the macro, which arrive later. Macro signals may arrive several microseconds after their transmission, while beacon signals may arrive tens of nanoseconds after they are transmitted. Tau values may also be set in a fractional sense, to provide additional resolution in identifying PNs. For example, Pilot Beacons 1 and 2, as seen in FIG. 1, may have the same PN, with different offsets for differentiation when Pilot Beacon 1 and Pilot Beacon 2 cannot be commonly received. For example, Pilot Beacon 1 may be offset by a Tau value that results in a position fix at the location of one entrance of the building, while Pilot Beacon 2 may be offset by a Tau value that results in a position fix at the location of a different entrance to the building. When they cannot be simultaneously received, the device will report the position desired for the associated beacon. When signals from beacons are simultaneously received by the device, other methods may be used for differentiation, including modulation of the signal, as described herein.

Figure 3:
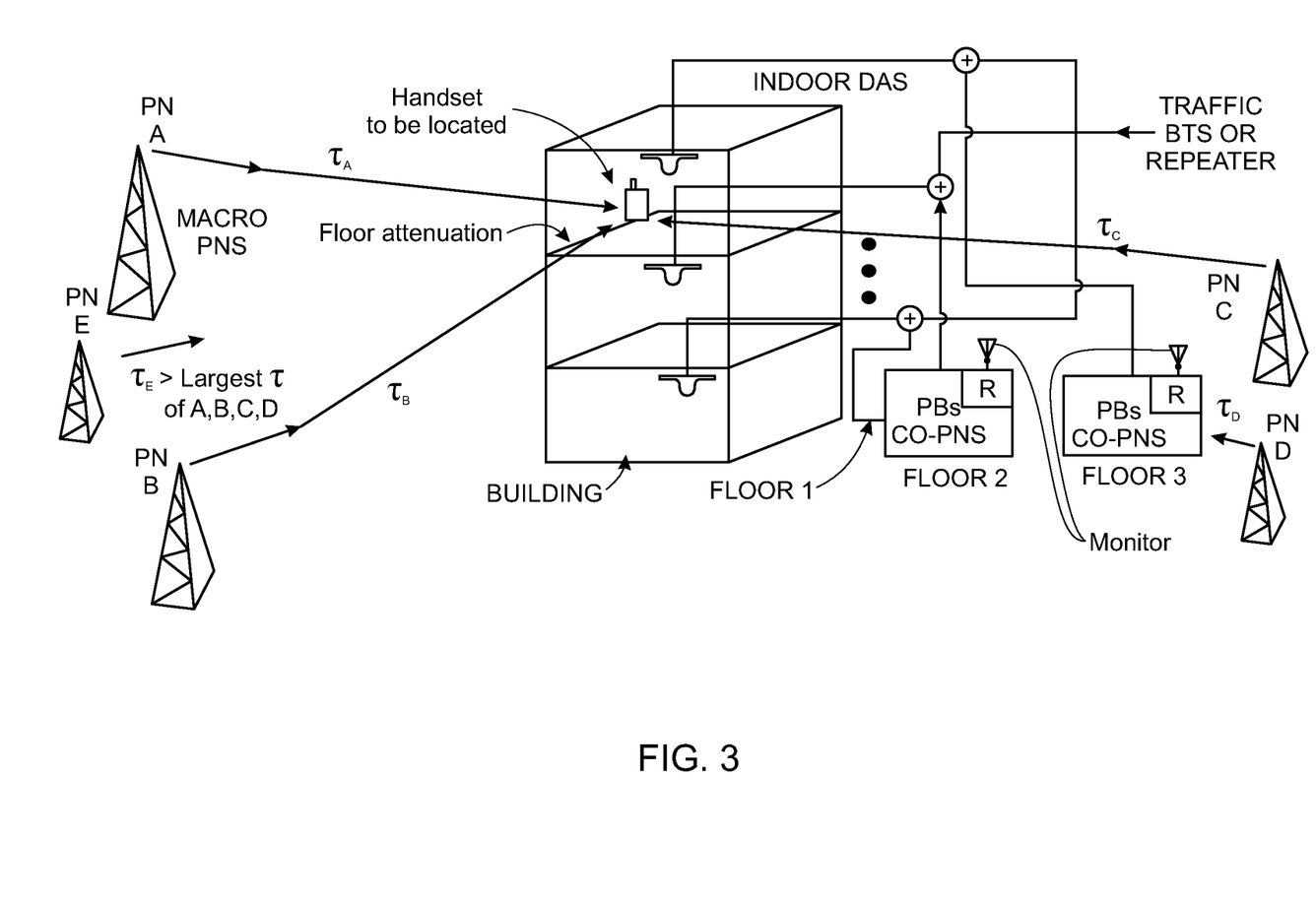
FIG. 3 shows an embodiment of the method and system to locate the position of an indoor handset using co-pilot beacons of the present invention.

Referring to FIG. 3, the present invention provides three-dimensional position determination using amplitude variable co-PN pilot beacons. In one embodiment, all PNs transmitted by beacons in the building "mimic" the macro PNs. The Tau values are set so that they cause Advanced Forward Link Trilateration ("AFLT") fixes and these fixes position a handset at a building's latitude and longitude. AFLT is a type of handset-based positioning technology. Unlike A-GPS, AFLT does not use GPS satellites to determine position. To determine position using AFLT, the device, e.g. smart phone, makes handset measurements of signals from nearby cellular base stations (towers) and reports the time (as a result of distance) measurements back to the PDE, which are then used to triangulate an approximate location of the handset. In general, at least three surrounding base stations' signals are required to get an optimal position fix.

One embodiment of the present invention uses an aPDE to more accurately locate the position of a device. In another embodiment of the present invention, the existing PDE may be used. In yet another embodiment of the present invention, an entirely new PDE may be used. The entirely new PDE requires access to certain measurements made within the handset chipset. The new PDE also needs to receive proprietary measurements from the device. The aPDE receives measurements that are reported by the PDE.

In one embodiment, an application running on the handset may be used to interrogate the values of the power levels of the received PNs, if available. The relative levels, and absolute levels, of these PNs may be used to determine the proximity of the handset to an antenna on a particular floor, as show in Table 1. For example, $P_{A1}$ may be +3 dB stronger then $P_{B1}$, $P_{A2}$ may be −3 dB weaker than $P_{B2}$, and $P_{A3}$ a may be equal in power to $P_{B3}$. After determining relative power levels across PNs the handset is able to determine the correct floor.

TABLE 1

| Floor 1 PNs | | | Floor 2 PNs | | | Floor 3 PNs | | |
|---|---|---|---|---|---|---|---|---|
| Macro PN | Tau | Ampl | Macro PN | Tau | Ampl | Macro PN | Tau | Ampl |
| A | $\tau_A$ | $P_{A1}$ | A | $\tau_A$ | $P_{A2}$ | A | $\tau_A$ | $P_{A3}$ |
| B | $\tau_B$ | $P_{B1}$ | B | $\tau_B$ | $P_{B2}$ | B | $\tau_B$ | $P_{B3}$ |
| C | $\tau_C$ | $P_{C1}$ | C | $\tau_C$ | $P_{C2}$ | C | $\tau_C$ | $P_{C3}$ |
| D | $\tau_D$ | $P_{D1}$ | D | $\tau_D$ | $P_{D2}$ | D | $\tau_D$ | $P_{D3}$ |

In another embodiment of the present invention, the handset may be interrogated to determine the time delay of the pilot signal, and the PDE may be used together with a handset to determine the position of the building, using AFLT, or other delay measuring algorithms. The levels of the PNs reported by the handset may be used to determine the floor that the handset is located on. In other words, if Tau measurements establish that the handset is in the building, $P_A$ and $P_B$ measurements may be compared to determine the floor that the handset is on.

In one embodiment of the present invention, the existing PDE in the system that uses AFLT for position determination may be augmented by an additional 3D, or z-axis PDE. In one embodiment, the device or handset contains an application to allow measurements of the relative levels of the pilot beacons. The application is used in conjunction with an aPDE to determine the z-axis. This may be done 1) with a handset application, 2) without a need for a resident handset application, or 3) the aPDE may be used to establish only the z-axis. In this mode, the aPDE does not need to establish the x-y location since that step is supplied by the existing PDE. The system and method of the present invention provides a relatively straight forward augmentation of 3D position onto an existing PDE, with high-integrity. High integrity means that changes to the network, e.g. the removal of a beacon, are known, as opposed to systems that do not control beacons, e.g. Wi-Fi.

Another advantage of the aPDE of the present invention is that all the files that are used for fixes in the existing PDE do not need to be made available to the new PDE. The fix files are not needed by the new PDE. The Tau values are set during installation, and/or when changes are made to the network. The aPDE uses an output file from the existing PDE. The new PDE, on the other hand, uses device measurements themselves and creates new PDE files. Advantages of the use of one system over the other depend on the availability of output files and measurements.

The integrity of the overall system is firth-ter ensured by using devices labeled "R" in FIG. 3. These off-air receivers, or handsets, ("R") are used to monitor the integrity of the transmitted signals from the macro, and, or pilot beacons. If a macro PN change occurs, the "R" device may be used to establish new Tau values for the pilot beacons. Alternatively, or together with "R," a handset may be used to make test calls to determine location, followed by any Tau value changes if and when they are needed.

For example, an application running on a device, e.g. a smartphone, may use device measurements, together with an existing PDE, to determine the position of the device. If the macro network has changed, the position will be reported correctly using measurements of the macro signals. However, the measurements will have errors when reporting measurements made on pilot beacons which have not been corrected to account for the change in the macro. This difference can be used to correct the pilot beacon settings, by using a device application that reports the changed PN offset, for example. One example of such an application is a known PN scanner.

A BTS, or base transceiver station, is a unit that facilitates wireless communication between a handset and the carrier station. In the non-repeater deployment, the Distributed Antenna System (DAS) is coupled to a base station directly using coax or fiber optic cable. For example, a wireless provider may install a base station in the basement of a building to feed the DAS in the building.

In one embodiment, the power levels $P_{An}$, $P_{Bn}$, $P_{Cn}$, $P_{Dn}$, may be chosen to provide coding gain and sensitivity improvement for floor detection. For example, orthogonal codes may be placed on each pilot beacon (e.g. Welsh codes). See Table 2, below, where L is the nominal required level of all PNs. The ±1 dB level may be changed to accommodate the level detection resolution of the handsets. For example, ±2 dB may be required to ensure detection for a larger number of floors, pilot beacons may be placed one per floor with PN levels using a binary code. In one embodiment of the present invention, 15 floors may be encoded using four PNs, 0000 and 1111 cannot be discerned, generally, because absolute PN measurements are not as accurate as relative levels.

TABLE 2

|  | $PN_A$ Level | $PN_B$ Level | $PN_C$ Level | $PN_D$ Level |
| --- | --- | --- | --- | --- |
| Floor 4 | L − 1 dB | L − 1 dB | L − 1 dB | L − 1 dB |
| Floor 3 | L − 1 dB | L + 1 dB | L − 1 dB | L + 1 dB |
| Floor 2 | L − 1 dB | L − 1 dB | L + 1 dB | L + 1 dB |
| Floor 1 | L − 1 dB | L + 1 dB | L + 1 dB | L − 1 dB |

In certain embodiments of the present invention, the PN signals are generated digitally in a field-programmable gate array ("FPGA") and transmitted over an antenna. Therefore, the relative PN levels will be retained and used in detecting handset location. Additional floors may be encoded using more PNs, or using multi-level codes or both (e.g. −2 dB, −1 dB, 0 dB, +1 dB, +2 dB per PN).

In another embodiment of the present invention, the level of individual PNs may also be time-modulated floors, buildings or other information may be encoded by varying the amplitude of a PN code, and measuring several samples of the PN level. In one embodiment, a PN may have a +2 dB amplitude for T=0 to 2 sec, and have a −2 dB amplitude for T=2 to 4 sec, a +2 dB amplitude for T=4 to 6 sec, and so on. This represents a coded message 1, 0, 1. A second PN may have a sequence opposite to this, i.e. 0, 1, 0. Other codes are also possible, e.g. 1, 1, 0 and 0, 0, 1 and the like. Thus, using two PNs and three time slots, eight distinct messages may be encoded. In other embodiments, time varying PNs may be mixed with statically chosen PNs to further increase the number of codes.

The method and system of the present invention provides for pilot selection in co-pilot beacon systems. As described previously, pilot beacons have their PNs set based on expected macro pilots in a building or other indoor location. These PNs may be distant PNs, or may be close PNs. If a close PN is not applied to a beacon, the accuracy of a fix from a macro PN may be adequate and not require the use of a beacon PN on that particular macro PN. For example, if PNs E, F, and G, as shown in FIG. 1, propagate adequately into the building, then an AFLT fix may be obtained by the PDE without requiring the use of an aPDE. In general, the more PNs that must be transmitted in the building, the higher the cost and the higher the interference. It is important then to determine carefully which PNs to transmit. In the system as seen in FIG. 1, if PNs E, F, and G do not have adequate power to provide a good fix, then PNs E, F, and (G should be added to the transmitted beacon signals in the building.

Pilot beacons of the present invention may be used in several ways. PNs of close-in macro sites can be used to improve AFLT, using the existing PDE. PNs of distant sites, with correct Tau and levels can be used to identify position within a building, using an aPDE, or a modified PDE. PNs with a signal coded to provide additional identification that the signal originated from a pilot beacon, and not the macro network can also be used. In another embodiment of the present invention, any of the PNs transmitted by pilot beacons may also be modulated to identify them as pilot beacons.

In certain embodiments of the present invention, PNs from distant sites are set with Tau values that do not correspond to the macro's expected Tau values. When doing this, the aPDE may be used, since the existing PDE will not generally report these PNs as AFLT fixes due to large errors and low weighting. The aPDE then has the capability to use the signal strength of these outlying PNs, re-used on beacons, to determine 3D position of a handset or device within a building.

It is somewhat more difficult to use AFLT with the existing PDE to determine position within a building because AFLT resolution is approximately 10 meters, and AFLT resolution is based on the distance to macro sites which may contain multipath components. In one embodiment of the present invention, an augmented PDE may be used with measurements of the signal strength of the distant PNs to determine the fine-positioning within a building. It is not a requirement that the Tau values of the distant PNs be exactly equal to the expected values from line of sight propagation. In practice, the existing PDE corrects for errors due to system deployment, for example, base station. Tau setting errors. Pilot beacon offsets need to account for these macro offsets to provide accurate position fixes. In certain embodiments, the Taus may be set to provide a better AFLT fix as compared to that of the existing PN. In other embodiments, an aPDE or an existing PDE may be used with a handset resident application that interrogates registers to perform direct measurements.

Figure 4:
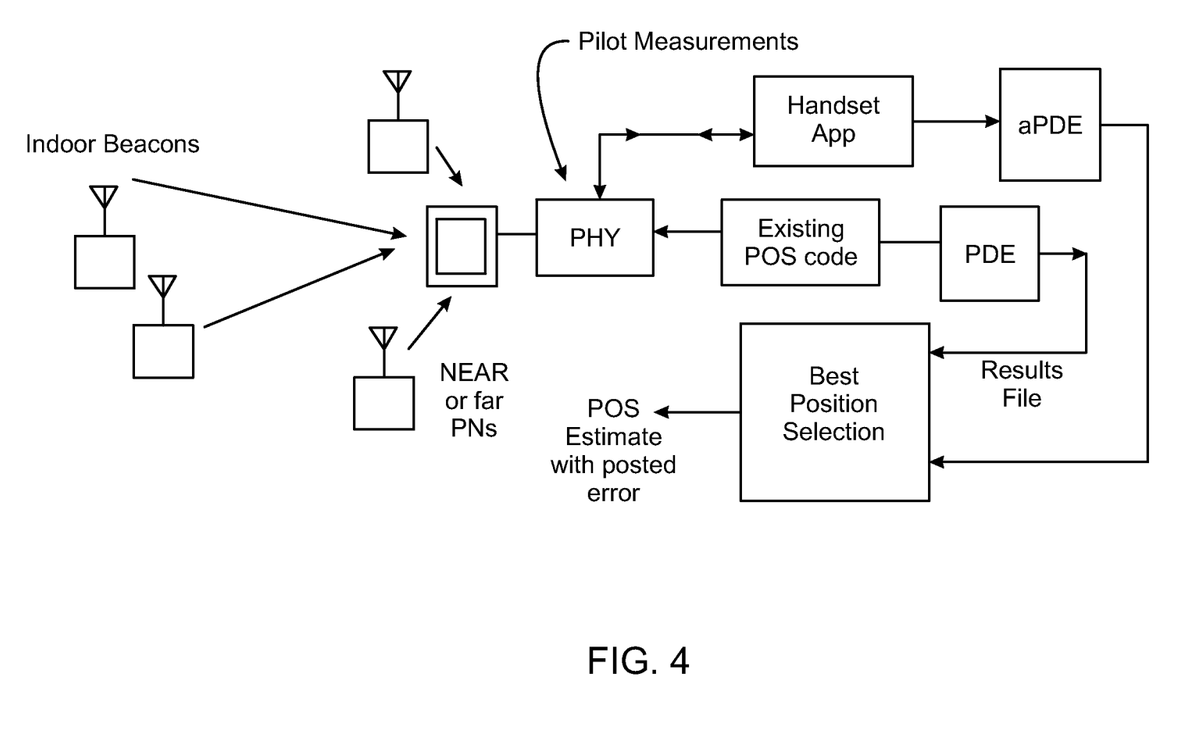
FIG. 4 shows an embodiment of the augmented PDE of the present invention.

Referring to FIG. 4, the system and method of the present invention uses a combination of PNs that are close and far. The handset application interrogates PHY registers in the handset chipset providing measurements of each PN, level, and delay. These measurements are used together with the PDE output file, optionally, to establish a position estimate. For example, PN signal strength may be determined by the handset application and used by the aPDE for signal-strength-based ranging and positioning. In general, PNs must be on the neighbor list of the serving PN to be scanned by the handset PHY layer. This provision depends on the handsets' algorithm for increasing code search speed.

The method and system of the present invention also provide for embedded pilot beacons. In certain embodiments, positioning pilot beacons may be embedded in the remote units of digital DAS. In a DAS that uses digital processing, it is advantageous to combine the signal processing that generates multiple pilot signals with the processing in the remote traffic signals. This allows separate PNs and modulations, if present, to be placed on each remote, thus enhancing positioning resolution. Normally, an embedded field-programmable gate array ("FPGA") or application-specific integrated circuit ("ASIC") in the remote will incorporate the processing necessary to perform the functions required by the pilot beacon transmitters.

In certain embodiments of the present invention with a distributed antenna system ("DAS"), pilot beacons may be injected into the antenna. The level of the pilot beacon power may be set by a measurement of the traffic pilot, or pilots, carried by the DAS. If the traffic pilot reduces in power, there is a possibility that the pilot beacon will be an interference source. Therefore, pilot beacon power may be reduced, to prevent interference.

In certain embodiments of the present invention, the timing of pilot beacons is carried by a signal distributed to the pilot beacons over coax, Ethernet, optical fiber, and the like. The 0.5 pulse-per-second signal is modulated onto a carrier and transmitted to the remote units and/or pilot beacons to be demodulated. Dispersion in the media then can have less impact on time accuracy, as compared to timing transmitted at baseband.

Figure 5:
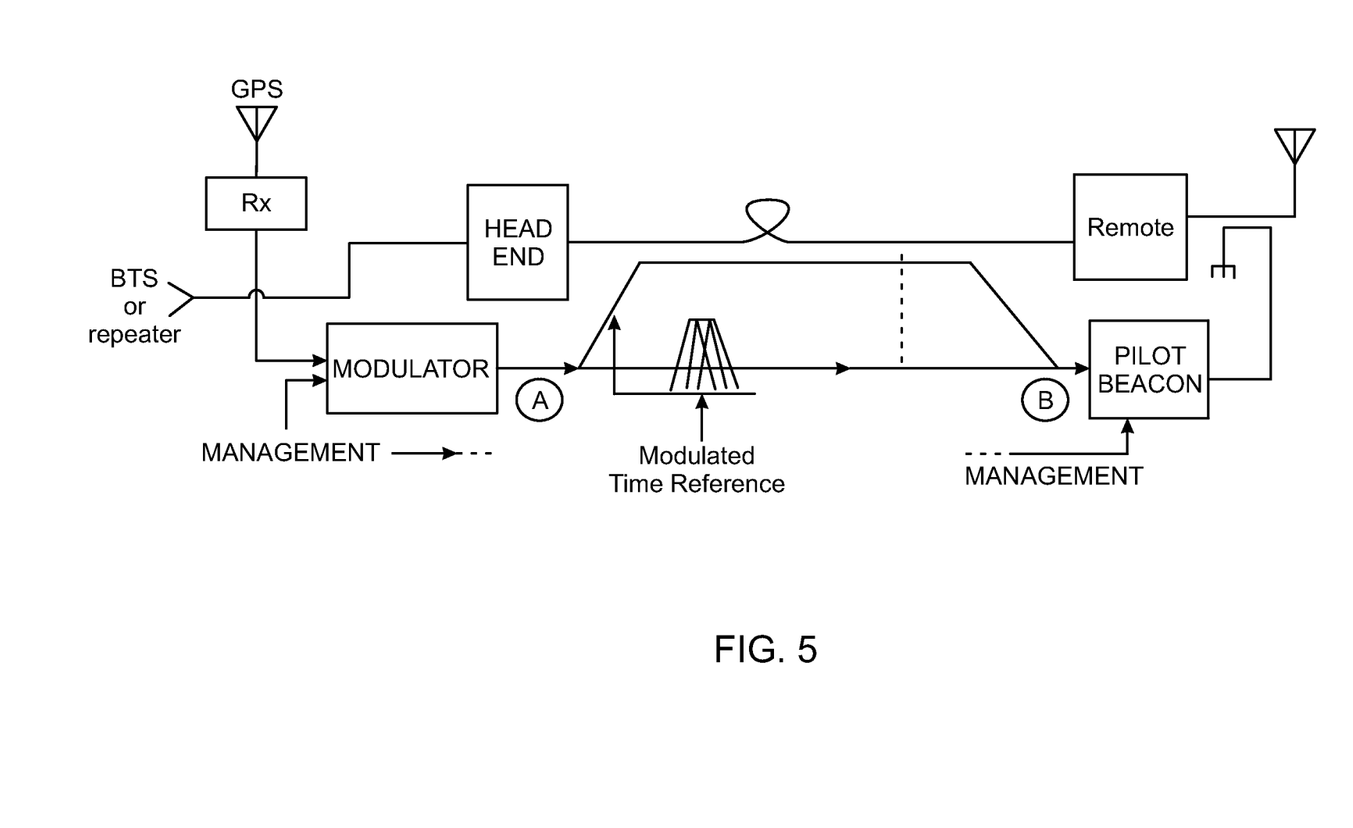
FIG. 5 shows an embodiment of the method and system using co-pilot beacons of the present invention.

Referring to FIG. 5, connection from A to B may be over a dedicated CAT 5/6 cable carrying a modulated RF signal. In one embodiment, management of the pilot beacon may be done over a dedicated CAT 5/6, or shared with a timing signal. In some embodiments, pilot beacons may be embedded in a repeater. Digital repeaters process signals and provide filtering, usually in a field-programmable gate array ("FPGA").

A pilot beacon with multiple PNs may be implemented in the repeater digital processing. In another embodiment, the monitor capability shown in FIG. 3 may be implemented within the repeater's digital processing. In some embodiments of the present invention, an RF off-air signal is received, PNs and their levels and/or delays are determined, and the measurements are used to set the PNs, levels, and Taus of the associated mimicking pilot beacons. In other embodiments, if the macro network changes a PN plan, the pilot beacons may be automatically updated in a similar way. A PN scanner may be used to determine that a change has occurred and corrections are applied to the pilot beacon settings. In one embodiment, the mimicking pilot beacons described herein may be used together with conventional pilot beacons, together with those that use new unassigned PN offsets, and together with those that are included in the macro database.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A method for determining the location of a wireless handset in a building, comprising:
providing one or more pilot beacons transmitting a plurality of pseudo-random number ("PN") codes with PN offsets, wherein the pilot beacons are located inside a building; the PN codes of the one or more pilot beacons corresponding to PN codes associated with cellular base-stations having known locations located outside the building, and the PN offsets of the one or more pilot beacons selected to reflect the only the delay of a signal propagating from a corresponding cellular base station to a predetermined location within the building, and wherein the PN offsets are set early such that the handset will report the PN codes received from the pilot beacon rather than distant PN's received from a macro network;
providing information regarding relative delays associated with one or more pilot beacon signals received by a wireless handset to a position determination entity ("PDE") resulting in output fix files calculated on the basis of the relative delays associated with one or more pilot beacon signals received by a wireless handset;
determining from the PDE output fix files a position fix of the predetermined location within the building for use in locating a wireless handset in a building, and
wherein the plurality of pseudo-random number ("PN") codes with PN offsets broadcast by the one or more pilot beacons is sufficient to fix a position of a wireless handset without a contribution from any physical base station.

2. The method for determining the location of a wireless handset in a building of claim 1, wherein the step of modifying the PN offsets of the pilot beacons comprises adjusting the power level.

3. The method for determining the location of a wireless handset in a building of claim 1, wherein the step of modifying the PN offsets of the pilot beacons comprises adjusting the amplitude.

4. The method for determining the location of a wireless handset in a building of claim 1, wherein the step of modifying the PN offsets of the pilot beacons comprises adjusting the time modulation.

5. The method for determining the location of a wireless handset in a building of claim 1, wherein the PDE output fix file comprises x-y coordinate information.

6. The method for determining the location of a wireless handset in a building of claim 1, further comprising providing a wireless handset configured to receive and to transmit information for use by the PDE in locating a wireless handset in a building.

7. The method for determining the location of a wireless handset in a building of claim 1, further comprising providing a macro network comprising a plurality of PN codes with PN offsets and associated location information.

8. The method of claim 1, further comprising the step of estimating a z-axis position of a handset on the basis of the relative amplitude of signals received at a handset from the one or more pilot beacons.

9. The method of claim 1, wherein the step of determining from the PDE output fix files a position fix of the predetermined location within the building for use in locating a wireless handset in a building does not require modification to a preexisting base station almanac.

10. The method of claim 1, further comprising providing a plurality of pilot beacons each having a location within the building, wherein each pilot beacon broadcasts PN offsets of the one or more pilot beacon, which, when provided to a PDE, create a position solution fixing the location of a wireless handset within a predetermined zone at the location of a given pilot beacon.

* * * * *